(12) United States Patent
Voegele et al.

(10) Patent No.: US 7,861,925 B2
(45) Date of Patent: Jan. 4, 2011

(54) MATERIAL DISPENSING STATION

(75) Inventors: Kary James Voegele, Fargo, ND (US);
Randy James Worrel, West Fargo, ND (US); Kurt Ray Wagner, Dilworth, MN (US)

(73) Assignee: Deere & Company, Moline, IL (US)

( * ) Notice: Subject to any disclaimer, the term of this patent is extended or adjusted under 35 U.S.C. 154(b) by 278 days.

(21) Appl. No.: 11/588,448

(22) Filed: Oct. 26, 2006

(65) Prior Publication Data

US 2008/0099554 A1 May 1, 2008

(51) Int. Cl.
*G06K 5/00* (2006.01)
(52) U.S. Cl. ............... 235/380; 235/381; 235/383; 235/385
(58) Field of Classification Search ............ 235/381, 235/383, 385, 380
See application file for complete search history.

(56) References Cited

U.S. PATENT DOCUMENTS

| | | | |
|---|---|---|---|
| 5,018,096 A * | 5/1991 | Aoyama | 711/164 |
| 5,205,436 A | 4/1993 | Savage | |
| 5,857,589 A | 1/1999 | Cline et al. | |
| 5,902,984 A * | 5/1999 | Planke | 235/381 |
| 6,550,683 B1 * | 4/2003 | Augustine | 235/462.45 |
| 6,564,121 B1 | 5/2003 | Wallace et al. | |
| 6,604,019 B2 | 8/2003 | Ahlin et al. | |
| 7,077,318 B2 * | 7/2006 | Venema et al. | 235/462.01 |
| 7,286,900 B1 | 10/2007 | Frederick et al. | |
| 7,357,314 B2 * | 4/2008 | Kusakawa | 235/381 |
| 2002/0007227 A1 * | 1/2002 | Prentice et al. | 700/121 |
| 2003/0080153 A1 * | 5/2003 | Saidman et al. | 222/146.5 |

* cited by examiner

*Primary Examiner*—Karl D. Frech

(57) ABSTRACT

A method of verifying a material application including the steps of inputting a first product number, inputting a second product number and confirming. The inputting of the first product number is done from a routing instrument. The inputting of the second product number is done from a number physically associated with the product. The confirming step is carried out by confirming the first product number and the second product number are identical.

20 Claims, 3 Drawing Sheets

MATERIAL DISPENSING STATION

FIELD OF THE INVENTION

The present invention relates to a material dispensing system, and, more particularly, to a computerized material dispensing system.

BACKGROUND OF THE INVENTION

In nearly every assembly process there is a need for piece parts that are identified by separate part numbers and are counted by the piece. In addition to piece parts that are utilized in the assembly process, often bulk materials are needed as a part of the assembly process. For example, materials such as lubricants, grease, solder paste, lock tight, heat sink grease and adhesives are brought to the assembly process in a bulk manner and a predetermined amount is utilized for various aspects of each assembly. These various materials, also referred to herein as chemistries, are used in a wide variety of products. If the wrong chemistry were applied to a product, that product may be susceptible to early field failure because of contamination, lack of proper adhesion, heat transfer and/or electro-migration related to improper cleaning methods of an electronic circuit. Often similar materials that look the same to the naked eye are co-located and it is necessary for an operator to select the correct product.

What is needed in the art is a system to ensure that the correct material is applied at the proper assembly step.

SUMMARY OF THE INVENTION

The present invention provides a system that ensures that the correct material is applied to the correct product by use of product, material and applicator identifiers.

The invention comprises, in one form thereof, a method of verifying a material application including the steps of inputting a first product number, inputting a second product number and confirming. The inputting of the first product number is done from a routing instrument. The inputting of the second product number is done from a number physically associated with the product. The confirming step is carried out by confirming the first product number and the second product number are identical.

DETAILED DESCRIPTION OF THE INVENTION

Figure 1:
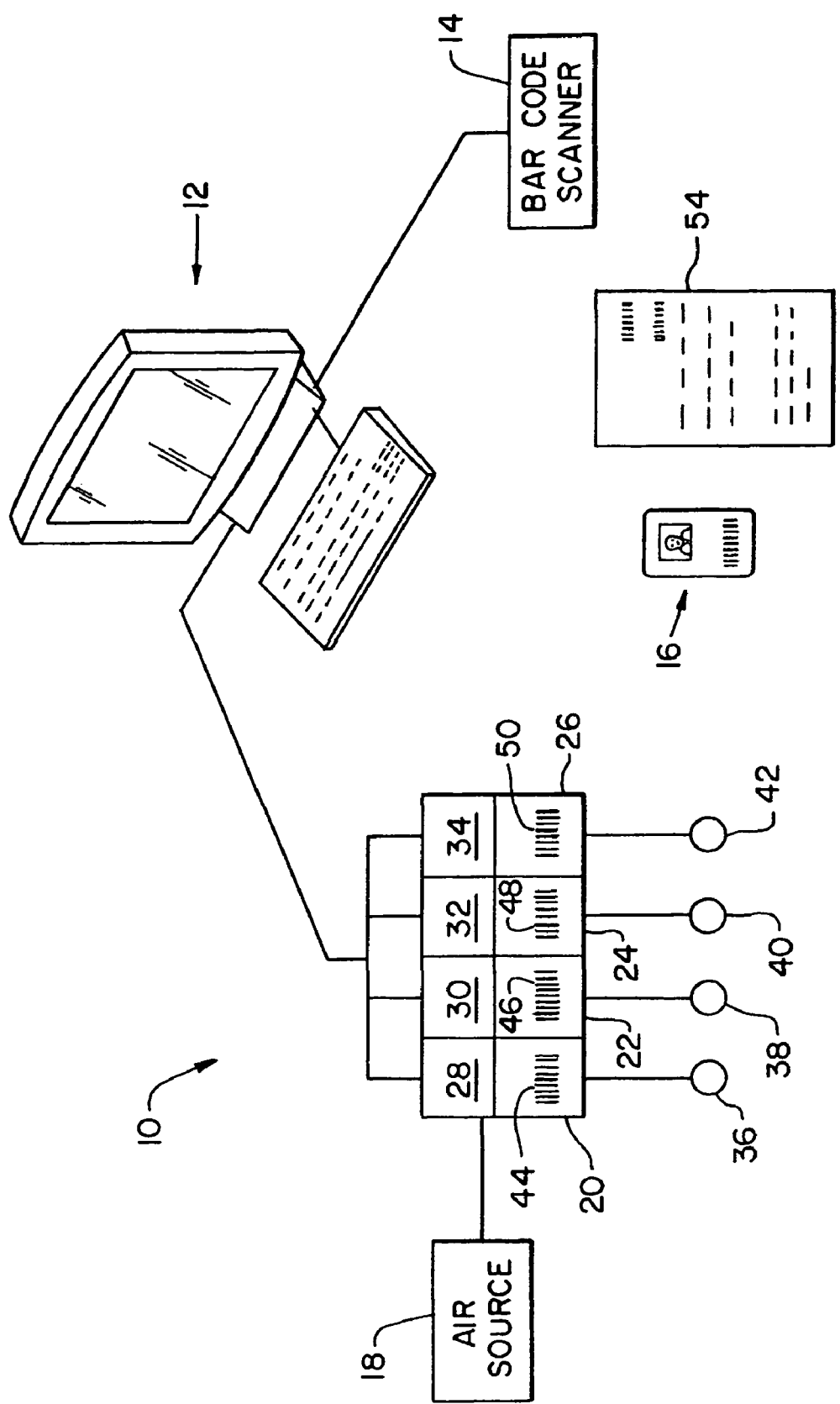
FIG. 1 is a schematicized illustration of one embodiment of the material dispensing system of the present invention.
Figure 2:
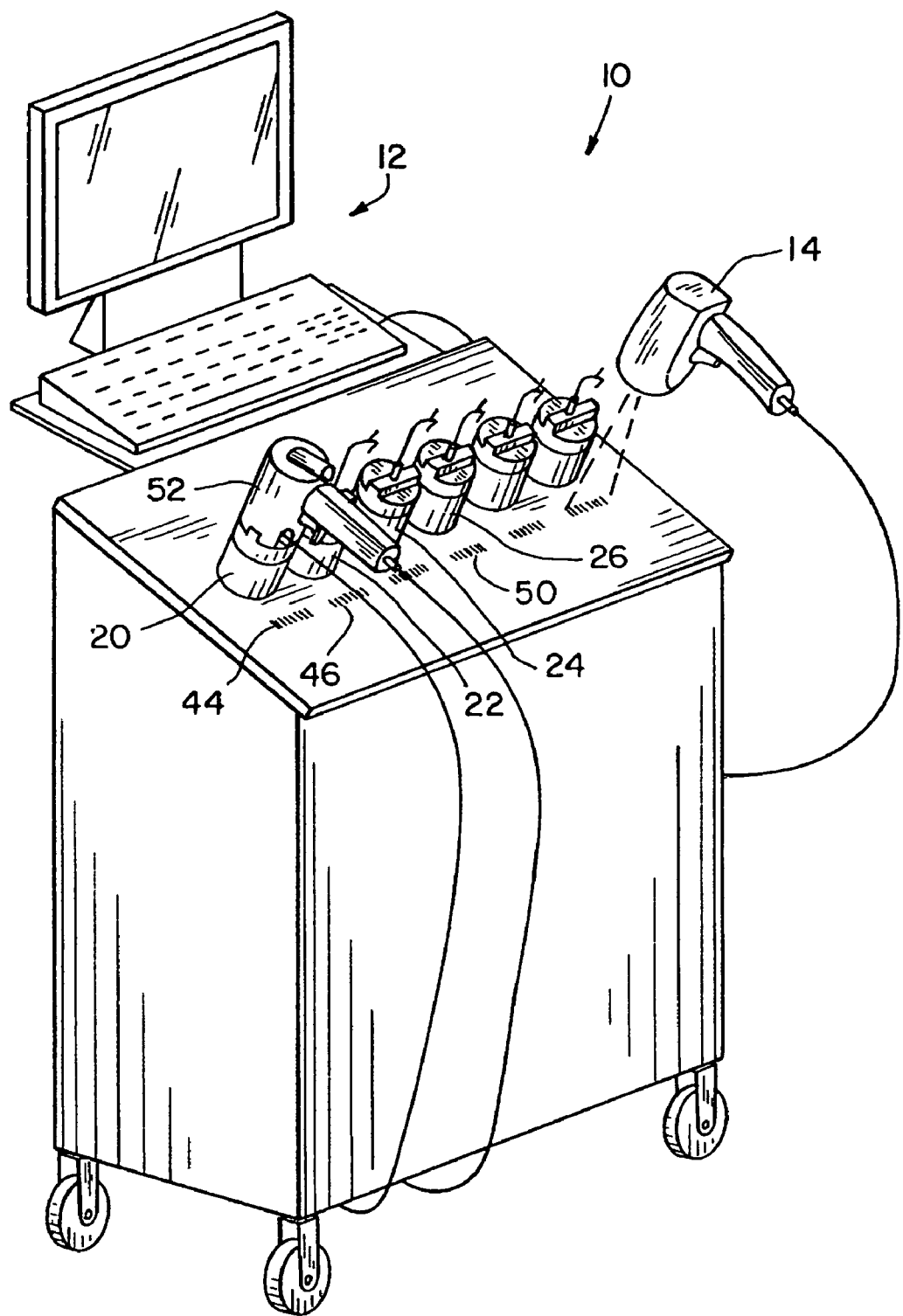
FIG. 2 is the material dispensing system of FIG. 1.

Referring now to the drawings, and more particularly to FIGS. 1 and 2 there is shown a material dispensing system 10 having a computer 12, a barcode scanner 14, an employee personnel identification 16 and an air source 18. Computer 12, also known as a controller 12, is communicatively coupled to barcode scanner 14 for the inputting of barcodes to computer 12, which utilizes method 100 for controlling material dispensing system 10. Although barcode scanner 14 is illustratively identified for purposes of illustrating the present invention, other identification tools and methods are also applicable and may be utilized in the present invention. Employee identification/barcode 16 illustrates a type of identification system utilized in many companies. Employee identification/barcode 16 is unique to the individual employee and may include a picture identification in addition to the barcode thereon.

Material dispensing system 10 additionally interfaces with material 20 also known as product 20, 22, 24 and 26 which are materials utilized in an assembly process. A valve/controller 28, 30, 32 or 34 is respectively associated with material 20, 22, 24 and 26 for the selective application of a motive force, illustrated here as a pneumatic system attached to air source 18. Valve/control 28, 30, 32 and 34 are selectively activated by computer 12 when utilizing method 100. A dispenser 36, 38, 40 or 42 also known as an applicator 36, 38, 40 or 42 may be individually assigned to each material 20, 22, 24 and 26, as illustrated in FIG. 1. Applicator 36, 38, 40 or 42 includes human interface features allowing an operator to apply selective amounts of material 20, 22, 24 or 26 to an assembly as part of an assembly process as needed. A barcode 44, 46, 48 or 50 is associated in a 1:1 correspondence with material 20, 22, 24 and 26. Barcodes 44, 46, 48 and 50 are associated with their respective products prior to being identified with material dispensing system 10.

As shown in FIG. 2 a single dispense gun 52 may be associated with material dispensing system 10, which may be electrically and/or pneumatically connected with material dispensing system 10 and dispense gun 52 also known as an applicator 52 may interface with valve/control 28, 30, 32 and 34 of material dispensing system 10. Although FIG. 2 illustrates two products beyond products 20, 22, 24 and 26 it is understood that the method of the present invention is applicable to any number of material items. Additionally, dispense gun 52 may include the valve/control features illustrated in FIG. 1 and may even incorporate identification functions such as a barcode scanner therein.

Material dispense system 10 by way of identifiers, herein illustrated as a barcode system, selectively initializes one of the material dispensing units depending on the application of method 100. All other products and any associated dispensing tools are non-functional while the activated applicator is in use.

Figure 3:
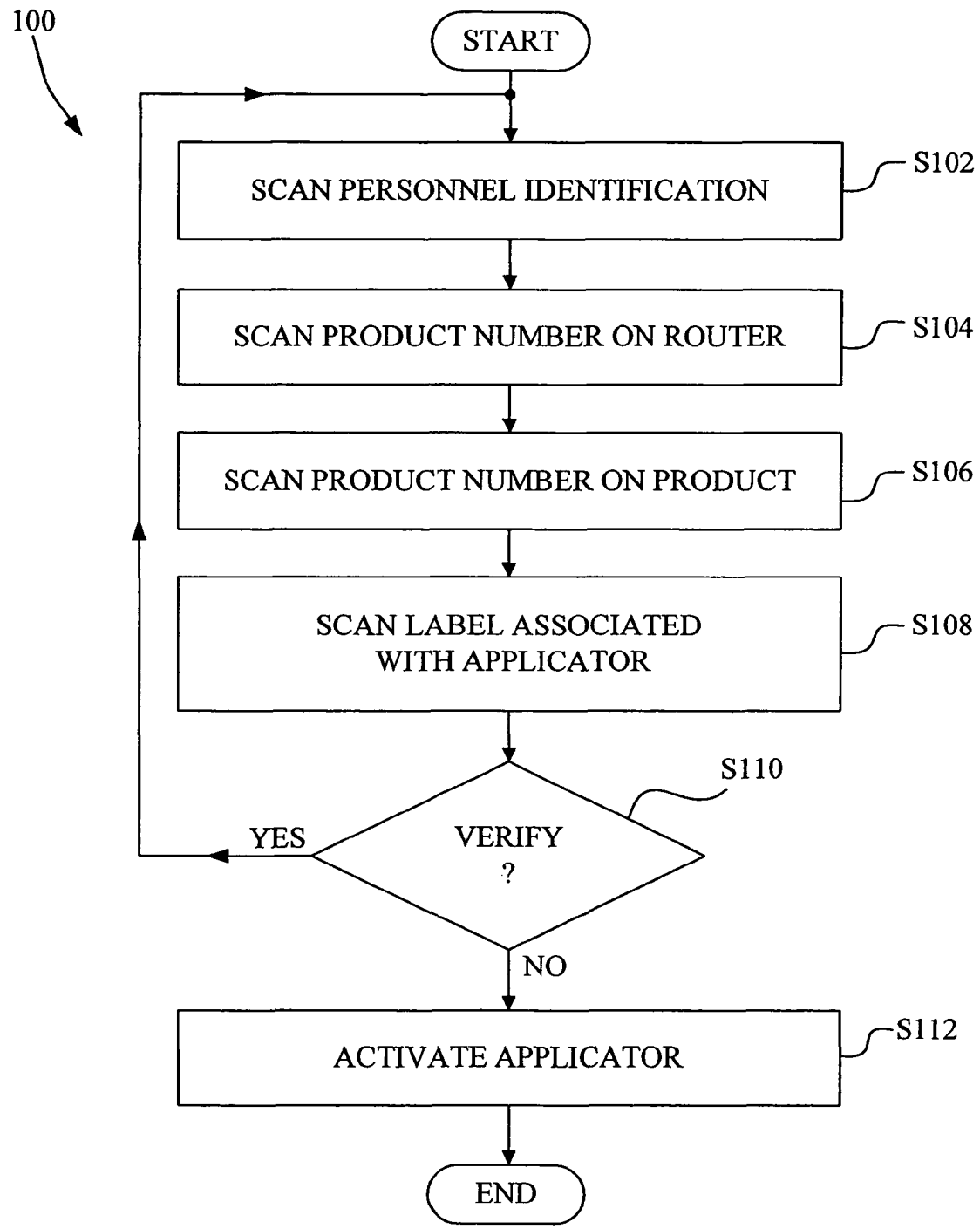
FIG. 3 illustrates one embodiment of a method used by the material dispensing system of FIGS. 1 and 2.

For purposes of illustration, materials 20, 22, 24 and 26 will be referred to as solder paste 20, 22, 24 or 26. In this application material dispensing system 10 will control the selection and dispensing of an appropriate solder paste. Now, additionally referring to FIG. 3, there is illustrated a method 100 including step S102 in which employee identification/barcode 16 is scanned by barcode scanner 14. This identification is utilized for connecting the operator to the particular process and may be date stamped and data collected during the execution of method 100 may be transferred to a network system, not illustrated. A router sheet 54 is commonly used in an assembly process to sequentially identify operations in the assembly process. While router sheet 54 will be referred to herein, it is recognized that the router sheet may be implemented as a part of a computer control system and may not be a physical piece of paper. At step S104, router sheet 54 is scanned by barcode scanner 14 to identify a product number that relates to one of solder pastes 20, 22, 24 or 26. At step S106 a product number associated with solder paste product 20, 22, 24 or 26 is scanned by barcode scanner 14 when it scans the associated barcode 44, 46, 48 or 50. As illustrated in FIG. 2 barcodes 44, 46, 48 and 50 may be located on material dispensing system 10, which corresponds to the location of material products 20, 22, 24 or 26. As illustrated in FIG. 1 individual dispensers 36, 38, 40 or 42 may be associated with each of solder pastes 20, 22, 24 or 26 for individual dispensing of the appropriate solder paste. At step S108, a barcode associated with the applicator may be scanned to identify the applicator which is associated with the product numbers identified in steps S104 and S106.

At step S110, if verification is required by another operator then steps S102-S108 are repeated with a different operator personnel identification being required at step S102 than the one that initially performed the scanning operations. If no further verification is required method 100 proceeds to step S112. At step S112 the selected applicator is activated allowing the operator to dispense the selected, and verified solder paste, for use in the assembly operation. If product numbers do not match in the verification cycle, with those originally entered, no applicator will be activated and the operators will be prompted to start the process of selecting the material all over again. Although the barcodes in FIG. 2 are illustrated as being positionally oriented relative to material dispensing system 10 the barcodes can also be located directly on dispensers 36, 38, 40 and 42. This may allow the skipping of step S106.

In the event that more than a predetermined time, such as two minutes, expires and no information is scanned or entered into material dispensing system 10, then system 10 will erase all of the current entries and method 100 will restart. A counter is displayed on the screen of computer 12 to alert the personnel of the time remaining, as the counter counts down, until method 100 will restart. The predetermined time may be built into the operating code or it may be configurable in a set-up file that the method accesses.

Having described the preferred embodiment, it will become apparent that various modifications can be made without departing from the scope of the invention as defined in the accompanying claims.

The invention claimed is:

1. A method of verifying a material application, comprising the steps of:
    inputting a first product number via a controller, the first product number associated with a representation of a dispensable material for an assembly process of an electronic product;
    inputting a second product number physically associated with the dispensable material;
    scanning, via a handheld scanner, a particular label associated with a corresponding applicator for dispensing or applying the material to an electronic product;
    confirming whether said first product number and said second product number are identical; and
    activating the applicator, capable of dispensing paste, to dispense the dispensable material by selective application of a motive force or pneumatic force based on the confirming, the applicator comprising a handheld dispense gun.

2. The method of claim 1, further comprising the step of inputting a first personnel identification of an operator performing the steps of the method to connect the operator with a particular process of the assembly process.

3. The method of claim 2, further comprising the step of inputting a second personnel identification associated with a second operator.

4. The method of claim 1, wherein said second product number is physically associated with said product by way of a barcode located on one of a product container and an applicator.

5. The method of claim 4, further comprising the step of repeating said confirming step.

6. The method of claim 5, further comprising the step of verifying that said first product number and said second product number entered in said repeating step are identical.

7. The method of claim 6, further comprising the step of verifying that said first personnel identification is different than said second personnel identification.

8. The method of claim 1, wherein the step of activating the applicator depends on said first product number and said second product number being identical.

9. The method of claim 8, further comprising the step of deactivating all other applicators except said applicator.

10. The method according to claim 1 wherein the dispensable material comprises one or more of the following: a solder paste, an adhesive, a lubricant, a grease, and a heat-sinking grease.

11. The method according to claim 1 wherein the representation comprises a physical router sheet or an electronic router sheet.

12. The method according to claim 1 further comprising:
    actuating the corresponding applicator for dispensing a selective amount of the material for the electronic product.

13. A material dispensing system, comprising:
    a controller for inputting a first product number associated with a representation of a dispensable material for an assembly process of an electronic product;
    a handheld bar code scanner for scanning a particular label associated with a corresponding dispenser for dispensing or applying the dispensable material to an electronic product, the controller communicatively coupled to the barcode scanner; and
    a plurality of dispensers that are selectively activated by said controller, at least one dispenser, capable of dispensing a paste as the dispensable material, by selective application of motive force or pneumatic force, dependent upon the first product number being identical to a second product number associated with a selected one of said dispensers, each of the dispensers comprising a handheld dispense gun.

14. The material dispensing system of claim 13, wherein said controller is arranged to:
    input the first product number by way of said bar code scanner;
    input the second product number physically associated with the product by way of said bar code scanner;
    confirm said first product number and said second product number are identical; and
    dispense the paste as the product by selective application of motive force or pneumatic force.

15. The material dispensing system of claim 13, wherein said second product number is a barcode located on one of said product dispensers.

16. The material dispensing system of claim 13, wherein said controller is arranged to activate one of said product dispensers if said first product number and said second product number are identical.

17. The material dispensing system of claim 16, wherein said controller further deactivates all other of said dispensers except said one of said dispensers.

18. The system according to claim 13 wherein the dispensable material comprises one or more of the following: a solder paste, an adhesive, a lubricant, a grease, and a heat-sinking grease.

19. The system according to claim 13 wherein the representation comprises a physical router sheet or an electronic router sheet.

20. The system according to claim 13 further comprising:
    a controllable valve coupled to the controller;
    an air source connected to the valve for dispensing a selective amount of the material for the electronic product via a selective application of pneumatic force controllable by the valve.

* * * * *